(12) United States Patent
Tanaka et al.

(10) Patent No.: US 7,210,357 B2
(45) Date of Patent: May 1, 2007

(54) PRESSURE SENSOR AND MANUFACTURING METHOD OF THE SAME

(75) Inventors: Masaaki Tanaka, Kariya (JP); Tiaki Mizuno, Toyota (JP); Hiromi Ariyoshi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/281,449

(22) Filed: Nov. 18, 2005

(65) Prior Publication Data

US 2006/0107750 A1    May 25, 2006

(30) Foreign Application Priority Data

Nov. 25, 2004  (JP) ............................. 2004-340390
Jul. 20, 2005  (JP) ............................. 2005-210148

(51) Int. Cl.
*G01L 9/00* (2006.01)

(52) U.S. Cl. .............................. 73/754; 73/753; 73/756

(58) Field of Classification Search .......... 73/700–756; 361/283.1–283.4
See application file for complete search history.

(56) References Cited

U.S. PATENT DOCUMENTS 6,408,697 B1 *  6/2002  Ootake et al. ................. 73/714

6,986,285 B2 *  1/2006  Avisse ........................... 73/726

FOREIGN PATENT DOCUMENTS

| JP | A-H09-43075 | 2/1997 |
| JP | A-H09-126920 | 5/1997 |
| JP | A-2004-279327 | 10/2004 |

* cited by examiner

*Primary Examiner*—Edward Lefkowitz
*Assistant Examiner*—Jermaine Jenkins
(74) *Attorney, Agent, or Firm*—Posz Law Group, PLC

(57) ABSTRACT

A pressure sensor includes a sensor chip having a pressure receiving surface formed on one surface of the sensor chip, a first case having one end portion at which the sensor chip is provided, a second case attached to the one end portion of the first case to cover the sensor chip. The second case is provided with a pressure introducing passage for introducing the pressure to the sensor chip, and a wiring board is provided at the one end portion of the first case to have a surface facing toward the pressure introducing passage. In the pressure sensor, the sensor chip is electrically connected with the surface of the wiring board through bumps by a flip-chip bonding such that the pressure receiving surface faces the surface of the wiring board, and an insulating member is provided to seal a connection portion of the bumps.

4 Claims, 11 Drawing Sheets

PRESSURE SENSOR AND MANUFACTURING METHOD OF THE SAME

CROSS REFERENCE TO RELATED APPLICATION

This application is based on Japanese Patent Applications No. 2004-340390 filed on Nov. 25, 2004 and No. 2005-210148 filed on Jul. 20, 2005, the contents of which are incorporated herein by reference in its entirety.

FIELD OF THE INVENTION

The present invention relates to a pressure sensor including a first case having a sensor chip at one end portion thereof and a second case having a pressure introducing passage for introducing a pressure toward the sensor chip. In the pressure sensor, the second case is mounted to the one end portion of the first case. The present invention also relates to a manufacturing method of a pressure sensor in which a sensor chip is electrically connected to a base material.

BACKGROUND OF THE INVENTION

In a conventional pressure sensor (e.g., JP-A-2004-279327), a pressure sensor includes a sensor chip for outputting electric signals in accordance with a pressure received at a pressure receiving surface formed on one surface of the sensor chip, a first case having the sensor chip at a one end portion thereof, a second case mounted to the one end portion of the first case so that the sensor chip is covered, and a pressure introducing passage for introducing the pressure toward the sensor chip.

In this kind of pressure sensor, a pressure medium is introduced through the pressure introducing passage of the second case. The pressure receiving surface of the sensor chip formed in the first case receives the pressure, and the sensor chip outputs electric signals in accordance with the received pressure so that pressure detection is performed.

The pressure sensor can be used in a vehicle as pressure sensors for detecting a fuel pressure, a lubricating oil pressure for an engine or a driving system, a refrigerant pressure of an air conditioner and an exhaust gas pressure and so on.

In this case, the pressure medium such as the refrigerant of the air conditioner, the lubricating oil or the exhaust gas is directly introduced to the pressure receiving surface of the sensor chip or an electrically connection portion of the sensor chip of the pressure sensor.

When the pressure receiving surface of the sensor chip faces the pressure introducing passage, the pressure receiving surface is exposed directly to a flow of the pressure medium introduced through the passage. Therefore, foreign objects mixed in the pressure medium, such as dust, directly hit the pressure receiving surface. Also, contaminated materials also adhere to the pressure receiving surface. As a result, there is a possibility that the sensor chip properties are adversely affected.

The exposure of the electrically connection portion of the sensor chip to the pressure medium may induce deterioration of the sensor chip, such as corrosion, due to the pressure medium or the contaminated materials mixed therein.

Therefore, in the conventional pressure sensor described in JP-A-2004-279327, the sensor chip is covered with a metal diaphragm, and an oil, which is used as a pressure transmitting medium, is sealed within the meal diaphragm.

In this case, the sensor chip and the electrically connection portion are therefore protected from the pressure medium. At the same time the pressure of the pressure medium is received at the metal diaphragm and is transmitted to the sensor chip via the pressure transmitting medium.

Also, in another conventional pressure sensor, the sensor chip and electrodes of a base material are electrically connected by bumps, and the bumps and peripheries of the electrically connection portions of the electrodes are sealed with an adhesive material (e.g. JP-A-9-126920). According to this method, the electrically connection portion of the sensor chip is protected from being exposed to the pressure medium.

In this type of conventional pressure sensor, after the sensor chip and the electrodes of the base material are bonded via the bumps, the adhesive material is injected through gaps between the sensor chip and the base material towards the bumps, thereby a sealing of the electrically connection portion by the adhesive material is completed.

In order to reduce the size of the above-described pressure sensors, a structure of a pressure sensor, in which the metal diaphragm and the oil are eliminated, has been studied by the inventors of the present application.

This is because the shape and the size of the metal diaphragm affect considerably the sensor properties and it has been thought difficult to change the shape and size of the metal diaphragm. As a consequence, it has been difficult to reduce the size of the pressure sensor including the metal diaphragm in its structure.

More specifically, the larger the metal diaphragm becomes, the better a sensitivity of the metal diaphragm becomes, thereby the sensitivity of the sensor also improves. However, the size of the metal diaphragm cannot be made smaller in order to manufacture a more compact pressure sensor, especially in the radial direction (an equivalent direction to the radial direction of the diaphragm), due to the reasons explained as above.

Consequently, the elimination of the metal diaphragm and the oil has been tried. However, the sensor chip or the electrically connection portion of the sensor chip, which are not sufficient in environmental resistant, are exposed directly to the pressure medium, such as the refrigerant of the air conditioner, the lubricating oil or the exhaust gas when the metal diaphragm and the oil are eliminated.

Therefore, it is hard to maintain the sensor properties by simply eliminating the metal diaphragm and the oil, because the harmful effects are expected to the sensor chip and also to the electrically connection portion thereof.

In the conventional pressure sensor described in JP-A-2004-279327, the electrical connections of the sensor chip are made by bonding wires. When the bonding wires are used as electrically connecting members to the sensor chip, a space is required between connecting portions for the wire bonding process. As a result, it is not preferable in view of the compactness of the sensor, especially in the radial direction of the sensor.

Also, in the conventional pressure sensor described in JP-A-9-126920, the adhesive material is injected through the gaps between the sensor chip and the base material after the sensor chip and the base material are connected via the bumps. Therefore, the injection of the adhesive material may not be precisely performed around the bumps, and the connection portions by the bumps may be partially exposed by not being sealed properly.

SUMMARY OF THE INVENTION

In view of the above-described problems, it is an object of the present invention to provide a pressure sensor, which includes a first case having a sensor chip at one end portion thereof and a second case having a pressure introducing passage therein. In the pressure sensor, the second case is mounted to the one end portion of the first case, and this pressure sensor can be made compact without deteriorating properties of the sensor.

It is another object of the present invention to provide a pressure sensor, in which a sensor chip and a base material are electrically connected via bumps, and a sealing of a connection portion of the bumps can be performed without providing an injection of an adhesive material through gaps between the sensor chip and the base material.

It is further another object of the present invention to provide a manufacturing method of a pressure sensor in which a sensor chip and a base material are electrically connected via bumps.

According to an aspect of the present invention, a pressure sensor includes a sensor chip for outputting an electric signals in accordance with a pressure received at a pressure receiving surface formed on one surface of the sensor chip, a first case having one end portion at which the sensor chip is provided, a second case attached to the one end portion of the first case to cover the sensor chip. Furthermore, the second case is provided with a pressure introducing passage for introducing the pressure to the sensor chip, and a wiring board is provided at the one end portion of the first case to have a surface facing toward the pressure introducing passage. In the pressure sensor, a plurality of bumps through which the sensor chip is electrically connected with the surface of the wiring board by a flip-chip bonding is provided such that the pressure receiving surface faces the surface of the wiring board, and an insulating member having an electrically insulating property seals a connection portion of the bumps. Accordingly, it is possible to effectively reduce the size of the pressure sensor.

Also, the pressure receiving surface of the sensor chip faces the surface of the wiring board. That is, the pressure receiving surface of the sensor chip faces to the opposite direction with respect to the pressure introducing passage. Therefore, the pressure receiving surface is protected from being hit directly by a pressure medium and foreign objects, and is also protected from receiving contaminated materials. Thus, it greatly reduces possibilities of receiving harmful effects.

Furthermore, the connection portion of the bumps is sealed with the insulating material, which has an electrically-insulating property, thereby the bumps or the electrodes on the sensor chip are also sealed with the insulating material. Therefore, these members are protected from the pressure medium, and the deterioration of the connection portion of the sensor chip, such as a corrosion, due to the pressure medium can be avoided.

The insulating member can be made of a resin or a ceramic, which has the electrically insulating property, and the insulating member can be made to have a film shape. Furthermore, the insulating member can be constructed of a plurality of film parts separated from each other to form at least a gap between the bumps, through which the pressure introduced from the pressure introducing passage is applied to the pressure receiving surface.

According to another aspect of the present invention, a method of manufacturing a pressure sensor includes: a step of providing bumps on a surface of one member of a sensor chip and a base material, and providing electrodes on a surface of the other member of both the sensor chip and the base material at corresponding positions with respect to the bumps; a step of covering the electrodes provided on the other member by an insulating membrane that is hardenable by heating; a step of arranging the one member and the other member opposite from each other so that the surfaces of the one member and the other member face each other; a step of pushing the bumps to the insulating membrane such that the bumps penetrate through the insulating membrane and are electrically connected to the electrodes; and a step of heating the insulating membrane to be hardened so as to seal peripheries of the bumps and the electrodes, which are electrically connected, by the hardened insulating membrane. Accordingly, the bumps and the electrodes are electrically connected and then the insulating membrane is hardened by heat, thereby peripheries around the bumps and the electrodes are sealed with the insulating membrane. In the pressure sensor manufactured by this method, the sealing of the connection portion of the sensor chip with the base material can be easily performed without injecting an adhesive material from gaps between the sensor chip and the base material after the connection.

The pushing can be performed after the insulating membrane becomes soft by the heating, and the sealing of the peripheries of the bumps and the electrodes can be performed by heating continuously the softened insulating membrane to be hardened. In this case, the electrical connection and the sealing of the connection parts of the sensor chip and the base material using the bumps can be easily accurately performed.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF THE PREFERRED EMBODIMENTS

Preferred embodiments according to the present invention will be described with reference to the appended drawings.

(First Embodiment)

Figure 1:
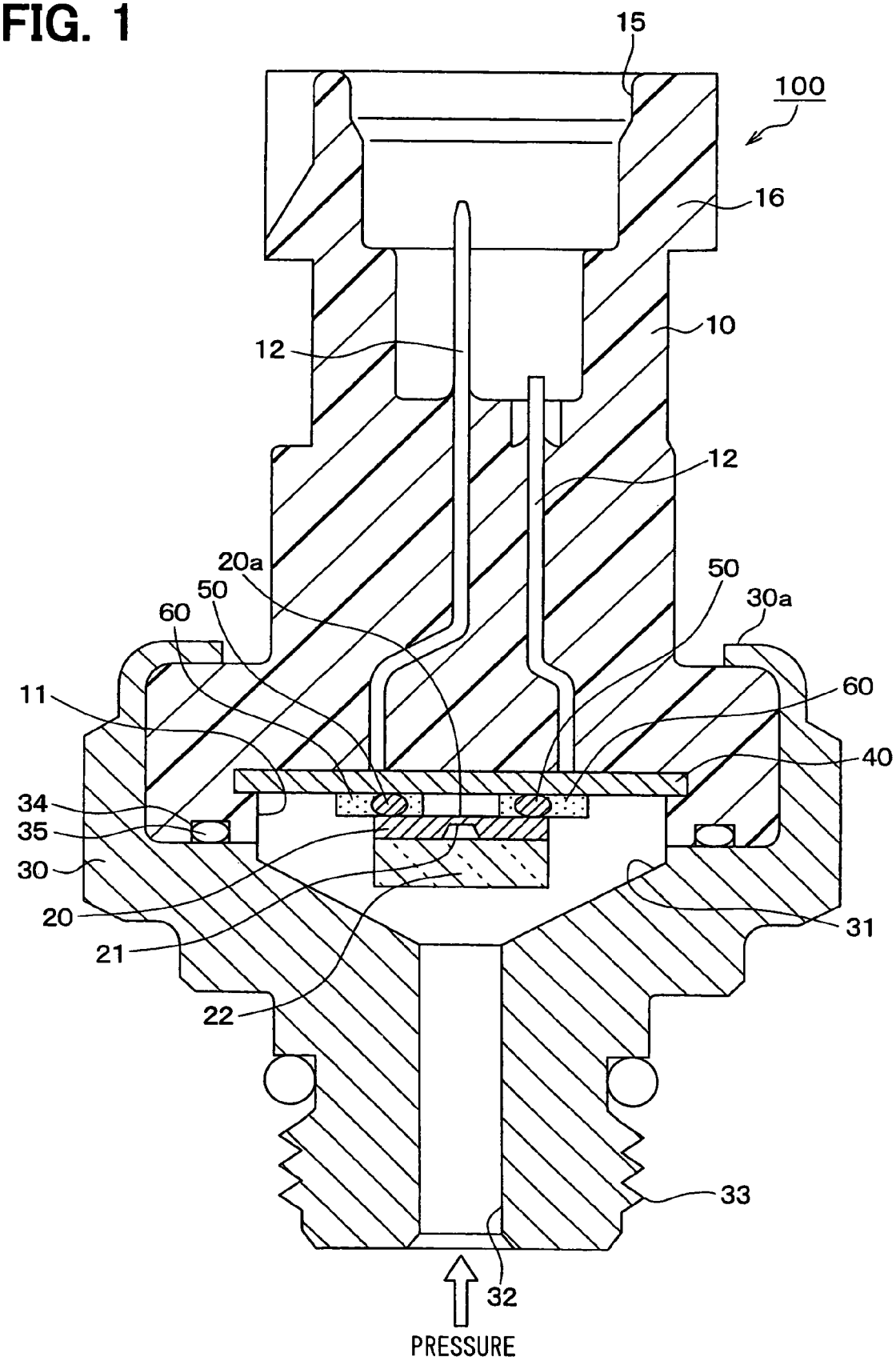
FIG. 1 is a schematic cross-sectional view showing a pressure sensor according to a first embodiment of the present invention.
Figure 2:
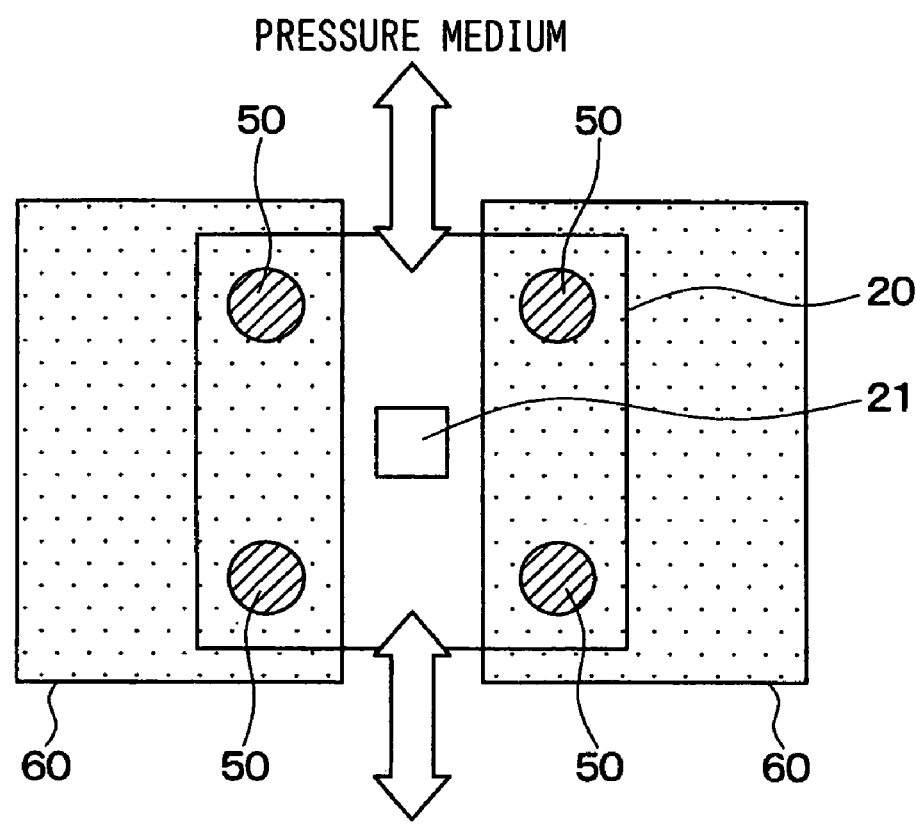
FIG. 2 is an enlarged plain view showing a vicinity of a sensor chip of the pressure sensor of FIG. 1.

FIG. 1 is a cross-sectional view illustrating a pressure sensor 100 according to the first embodiment of the present invention and FIG. 2 is an enlarged plain view showing a vicinity of a sensor chip 20 of the pressure sensor 100 of FIG. 1, viewed from the side of a pedestal 22 of the sensor chip 20. FIG. 2 shows some parts transparently, for only easily indicating the position of each part.

The pressure sensor 100 is mounted to a vehicle for example and used as a pressure sensor for detecting a fuel pressure, a lubricating oil pressure for an engine or a driving system, a refrigerant pressure for an air conditioner or an exhaust gas pressure.

The pressure sensor 100 includes the sensor chip 20, having a pressure receiving surface 20a on an one surface thereof, for outputting electric signals in accordance with a pressure received on the pressure receiving surface 20a, a connector case 10 having the sensor chip 20 at a one end portion thereof, a housing 30 attached to the one end portion of the first case 10 so as to cover the sensor chip 20, and a pressure introducing passage 32 provided in the second case 30, for introducing a pressure to the sensor chip 20.

In the pressure sensor 100, the connector case 10 as a first case has a substantially cylindrical shape, and is formed from resin such as polyphenylene sulphide (PPS) or polybutylene terephthalate (PBT) by molding. A recess 11 is formed on a surface of the one end portion of the connector case 10 (e.g., a lower end surface of the connector case 10 in FIG. 1).

The sensor chip 20 as a pressure detecting element is provided in the recess 11. The sensor chip 20 of this embodiment has a diaphragm 21 as a pressure receiving portion in a center area of the surface 20a of the sensor chip 20. The surface of the diaphragm 21 (an upper surface of the diaphragm 21 in FIG. 1) constitutes a part of the pressure receiving portion 20a of the sensor chip 20.

A cavity is formed by removing a back surface part of the sensor chip 20 of the pressure receiving surface 20a (lower surface of the sensor chip 20 in FIG. 1) by an etching or similar methods. The diaphragm 21 is a bottom portion of the cavity formed as above.

The sensor chip 20 is integrally formed with a pedestal 22 made of glass by anodizing or the like at the back surface of the sensor chip 20. Here, the cavity of the back side of the sensor chip 20 is sealed air-tightly by the sensor chip 20 and the pedestal 22, and this cavity serves as a reference pressure chamber such as a vacuum pressure chamber.

The sensor chip 20 according to this embodiment is a diaphragm type semiconductor, which converts the received pressure at the diaphragm 21 to electric signals and outputs the electric signals as sensor signals.

In this diaphragm type semiconductor sensor chip 20, a bridge circuit consisting of, for example, a stress gauge may be formed on the diaphragm 21. Changes in a resistance value of the bridge circuit can be detected by deformation of the diaphragm 21.

Although it is not shown, a sensor signal processing circuit including a transistor element and various wirings, may be formed by a semiconductor processing technique in the vicinity of the diaphragm 21 at the side of the pressure receiving surface 20a of the sensor chip 20.

That is, the sensor chip 20 may be an integrated sensor chip in which the diaphragm 21 as the pressure receiving portion and the sensor signal processing circuit are formed integrally. However, the sensor chip 20 is not necessarily limited to the integrated sensor chip. For example, the signals detected based on the deformation of the diaphragm 21 may be processed by an external circuit.

As shown in FIG. 1, in the recess 11 located at the one end portion of the connector case 10, a wiring board 40 is provided such that a back surface thereof (a lower surface in FIG. 1) faces to the pressure introducing passage 32 of the housing 30. The wiring board 40 is fixed to the connector case 10 by an adhesion, for example.

The wiring board 40 can be made from ceramic or resin, but not limited to specific materials. Also, the wiring board 40 can be either a single layered board or a multi-layered board. In this embodiment, the wiring board 40 is a ceramic board.

A circuit for processing the electric signals outputted from the sensor chip 20 can be formed in the wiring board 40. Especially, if the sensor chip 20 is not the integrated type sensor chip as explained above, it is preferable to use the wiring board 40 having the circuit for processing the sensor signals.

As shown in FIG. 1 and FIG. 2, the sensor chip 20 is joined to the back surface of the wiring board 40, which faces to the pressure introducing passage 32, by a flip-chip bonding.

The sensor chip 20 is electrically connected with the wiring board 40 by bumps 50 therebetween in a state where the pressure receiving surface 20a of the sensor chip 20 faces to the back surface of the wiring board 40. The bumps 50 may be general gold bumps or solder bumps.

Although not shown in FIG. 1 and FIG. 2, electrodes made from e.g. aluminum are provided around an outer periphery of the diaphragm 21 of the sensor chip 20. These electrodes are connected to electrodes (not shown) arranged on the back surface of the wiring board 40 via the bumps 50.

Further, as shown in FIG. 1 and FIG. 2, in the pressure sensor 100 according to this embodiment, connection portions of the bump 50 are sealed by being wrapped with an insulating member 60 having an electrically insulating property.

A bump connection portions include the bumps 50, the electrodes of the sensor chip 20 connected with the bumps 50 and the electrodes of the wiring board 40 connected with the bumps 50. That is, in the pressure sensor 100, the bumps 50 and the electrodes connected to the bumps 50 are sealed with the insulating member 60.

The insulating member 60 is made from a resin or a ceramic having the electrically-insulating property as well as an adhering property. To be precise, the insulating members 60 are made of an epoxy resin, and for example NCF (Non Conductive Film) or NCP (Non Conductive Paste) can be used.

As explained above, in the recess 11 of the one end portion of the connector case 10, the sensor chip 20 is electrically connected with the wiring board 40 by the flip-chip bonding and fixed to the connector case 10 via the wiring board 40.

Next, a connection of the sensor chip 20 to the wiring board 40 will be explained. The sensor chip 20 formed integrally with the pedestal 22 is prepared. The bumps 50 are also formed on the sensor chip 20. The sensor chip 20 is mounted to the back surface of the wiring board 40 via the bumps 50, and flip-chip bonding is performed by using an ultrasonic bonding or a soldering reflow.

A resinous material is provided around the connected parts of the bumps 50 by pasting, and is hardened to form the insulating member 60.

When the insulating member 60 is a film, the film is placed between the bumps 50 of the sensor chip 20 and the wiring board 40. The bumps 50 are pressed to the film until the bumps 50 burst and penetrate through the film to directly contact the wiring board 40. Then, as explained above, by performing the flip-chip bonding via the bumps 50 with the ultrasonic bonding or the soldering reflow, a film shaped insulating member 60 can be formed. A more detailed explanation about a method to form the film-shaped insulating member 60 will be described later.

As shown in FIG. 1, a plurality of bar-shaped metallic terminals (connector pins) 12 for connecting the sensor chip 20 with e.g. external circuits are provided in the connector case 10.

The terminals 12 are electrically connected with the wiring board 40 thereby the sensor chip 20 is electrically connectable to an external via the wiring board 40 and the terminals 12.

In FIG. 1, for example, one end portion of the each terminal 12 (a lower end in FIG. 1) is exposed to the one end portion of the connector case 10, that is an inside of the recess 11 of the connector case 10.

The exposed portions of the terminals 12 and the wiring board 40 are electrically connected. As the electrically connecting method, a soldering, a welding, a brazing or using a conductive adhesive or various electrical bonding can be used.

In this embodiment, the terminals 12 are made from a plated material, for example, brass with Ni plating. The terminals 12 are integrally formed with the connector case 10 by insert-molding thereby supported within the connector case 10.

On the other hand, as shown in FIG. 1, the other end portion of the connector case 10 (i.e., an upper end in FIG. 1) is formed as an opening portion 15. The other ends of the terminals 12 which are the opposite ends to the ones exposed to the recess 11, are exposed into the opening portion 15.

The ends of the terminals 12 exposed to the opening portion 15 of the other end portion of the connector case 10 are electrically connected with the external circuits (e.g. ECU of the vehicle) by external wires, such as wire harnesses (not shown).

That is, the other end portion of the connector case 10 and the ends of the terminals 12 protruding into the opening portion 15 serve as a connecting portion 16 for a connection to the external circuits. Therefore, signal transmission between the sensor chip 20 and the exterior is performed through the bumps 50, the wiring board 40 and the terminals 12.

The housing 30 has an opening portion 31 at one end portion thereof (e.g., an upper end in FIG. 1) and has the pressure introducing passage 32 for introducing the pressure mediums from an outside at an end portion thereof (e.g., a lower end in FIG. 1).

The pressure medium can be the refrigerant of the air conditioner, the fuel for the engine such as gasoline, the lubricating oil for the engine or the driving system and the exhaust gas. The housing 30 can be made of a metallic material such as stainless steel (SUS) and can be formed by press-punching or cutting work.

A screw portion 33 for fixing the pressure sensor 100 to an appropriate part of the vehicle such as a refrigerant pipe of the air conditioner or a fuel pipe of the vehicle, is formed on an outer surface of the end portion of the housing 30.

The one end portion of the connector case 10 (i.e., a lower end in FIG. 1) is inserted into the opening portion of 31 of the housing 30. In this inserted state, the housing 30 is fixed to the connector case 10 to cover the recess 11 of the connector case 10. Here, an end portion 30a of the one end portion of the housing 30 is fastened to the connector case 10.

A ring shaped trench (an O-ring trench) 34 is formed on a surface of the one end portion of the housing 30. An O-ring 35 is arranged within the O-ring trench 34 to seal the housing 30 and the connector case 10 airtightly. The O-ring 35 is made of an elastic material such as silicon rubber.

The manufacturing method of the pressure sensor 100 will be described with an example. The connector case 10 having the insert-molded terminals 12 is prepared. The wiring board 40, to which the sensor chip 20 integrated with the pedestal 22 is flip-chip bonded and the insulating member 60 is formed, is also prepared.

The forming method of the wiring board 40, to which the sensor chip 20 is attached, is previously explained. The wiring board 40 is disposed in the recess 11 of the connector case 10 by e.g. adhesion. At the same time, the wiring board 40 and the terminals 12 are electrically connected.

Next, the housing 30 is prepared and the opening portion 31 of the housing 30 is fitted to the one end portion of the connector case 10 via the O-ring 35. The end portion 30a of the housing 30 is fastened to the connector case 10 thereby the housing 30 and the connector case 10 are air-tightly integrated. The connector case 10 and the housing 30 are fixed and assembled to form the pressure sensor 100 shown in FIG. 1.

The manufacturing method of the wiring board 40 having the sensor chip 20, when the insulating member 60 is a film and formed as an insulating membrane 60 made from NCF, will be explained by referring to FIGS. 3A through 5B.

Figure 3A:
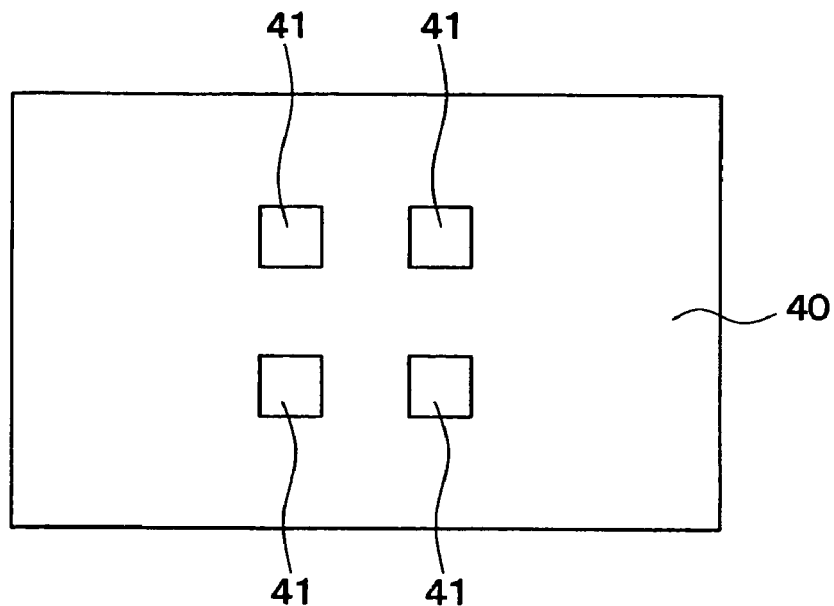
FIGS. 3A and 3B are top views showing a pasting process in a manufacturing method of the pressure sensor according to the first embodiment.
Figure 3B:
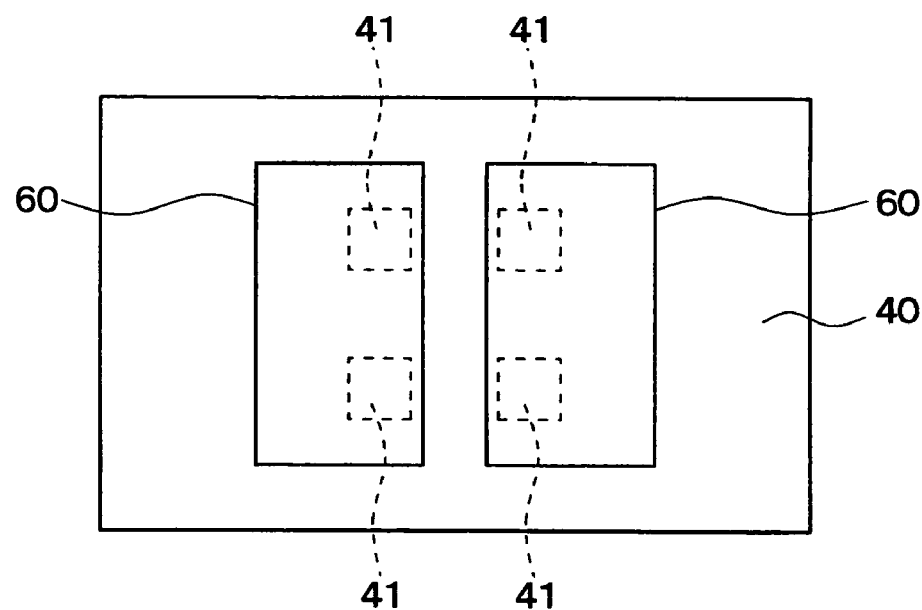

FIG. 3A and FIG. 3B show a pasting process (bonding process) of the insulating membrane 60 onto one surface (i.e., back surface in FIG. 1) of the wiring board 40 with a planar view of the wiring board 40. In FIGS. 3A, 3B, electrodes 41 on the back surface of the wiring board 40 to be connected to the bumps 50, are shown. The electrodes 41 on the wiring board 40 will be referred as base material electrodes 41 hereinafter.

Figure 4A:
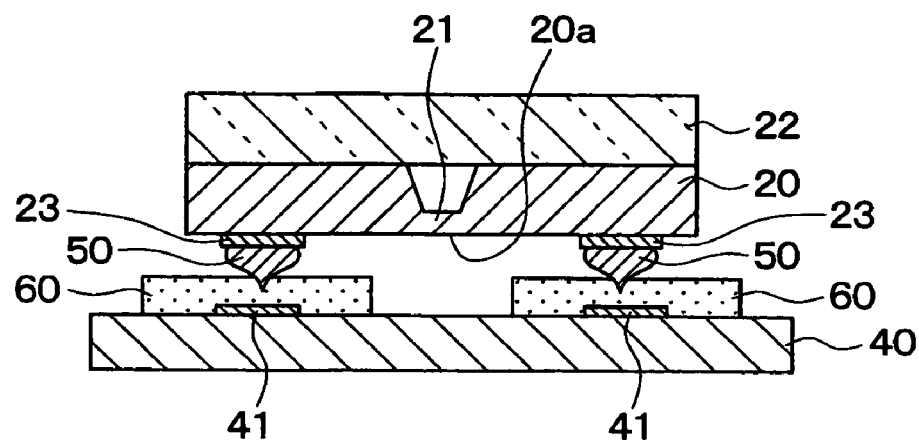
FIG. 4A is a schematic cross-sectional view showing a connecting process in the manufacturing method of the pressure sensor.
Figure 4B:
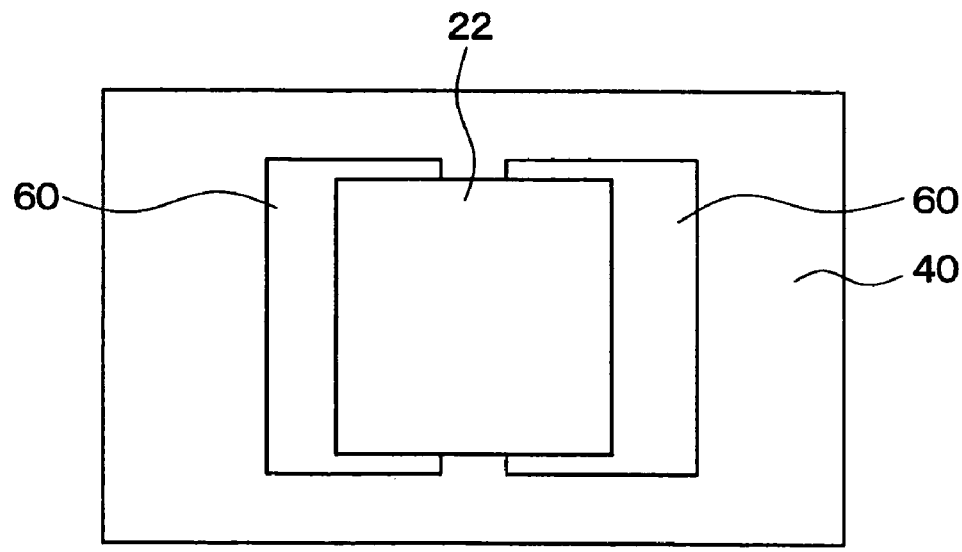
FIG. 4B is a top view of FIG. 4A according to the pressure sensor according to the first embodiment.
Figure 5A:
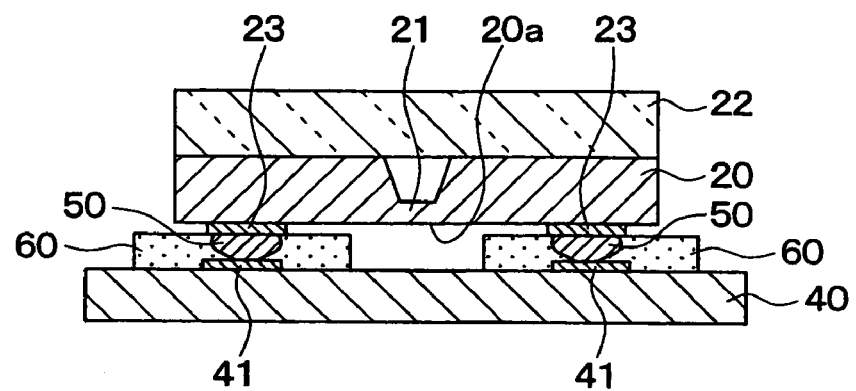
FIG. 5A is a schematic cross-sectional view showing the connecting process and a sealing process in the manufacturing method of the pressure sensor.
Figure 5B:
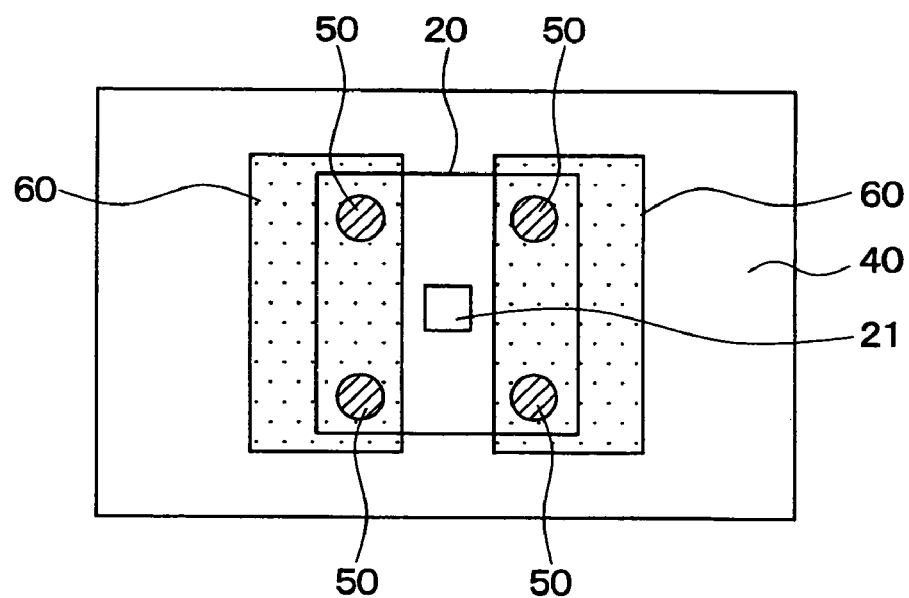
FIG. 5B is a transparent top view of FIG. 5A, showing position relationships between the sensor ship and bumps, according to the first embodiment.

FIG. 4A and FIG. 4B show a connecting process of the bumps 50 with the base material electrodes 41. FIG. 4A is a cross-sectional view and FIG. 4B is a top view of FIG. 4A. FIG. 5A is a cross-sectional view showing a connecting process of the bumps 50 with the base material electrodes 41 and a sealing process by the insulating membrane 60. FIG. 5B is a transparent top view of FIG. 5A without the pedestal.

Electrodes 23, which are connected with the bumps 50 of the sensor chip 20, are shown in FIG. 4A and FIG. 5A together with the base material electrodes 41. The electrodes 23 of the sensor chip 20 will be referred as the chip electrodes 23 hereinafter.

The chip electrodes 23 are made from aluminum and provided on the pressure receiving surface 20a of the sensor chip 20. The base material electrodes 41 are made from gold plating and provided on the back surface of the wiring board 40.

When the pressure receiving surface 20a of the sensor chip 20 is provided to face the back surface of the wiring board 40, the chip electrodes 23 and the base material electrodes 41 are also provided to face each other.

In this manufacturing method, the sensor chip 20 having the pressure receiving surface 20a and the wiring board 40 as the base material are prepared. The bumps 50 are provided at positions of the pressure receiving surface 20a, which is the one surface of the sensor chip 20.

The bumps 50 are e.g. gold bumps and are formed on the chip electrodes 23 by using a wire bonding apparatus, as shown in FIG. 4A. Also, as shown in FIG. 3A, on the back surface of the wiring board 40, the base material electrodes 41 are formed by performing gold plating on a copper base underneath, at corresponding positions to the bumps 50.

Thus, the sensor chip 20 having the bumps 50 on the one surface thereof and the wiring board 40 having the base material electrodes 41 are prepared. Next, the pasting process is performed as shown in FIGS. 3A, 3B, and the connecting process and the sealing process are performed sequentially as shown in FIGS. 4A through 5B. The manufacturing method is performed using a generally known ultrasonic bonding apparatus so that the bumps 50 and the base material electrodes 41 are ultrasonically bonded.

In the pasting process, as shown in FIGS. 3A and 3B, the insulating membrane 60 is pasted onto the back surface of the wiring board 40 in advance, and the insulating membrane 60 covers the base material electrodes 41.

In this embodiment, the insulating membranes 60 are provided so that at least one gap is formed between the bumps 50, as shown in FIG. 3B. This is because the pressure is to be introduced through the gap between the bumps 50. The insulating membranes 60 are made from the insulating film sheet by cutting into an appropriate shape in accordance with a placing pattern by a cutter, and then pasted (bonded).

The insulating membrane 60 made from a film shaped NCF is, as described above, made of the epoxy resin having a hardening property by heat. In this embodiment, the insulating membrane 60 having a property of becoming soft by heat at first and then becoming hard when the heat is kept giving to the softened state, is used.

Figure 6:
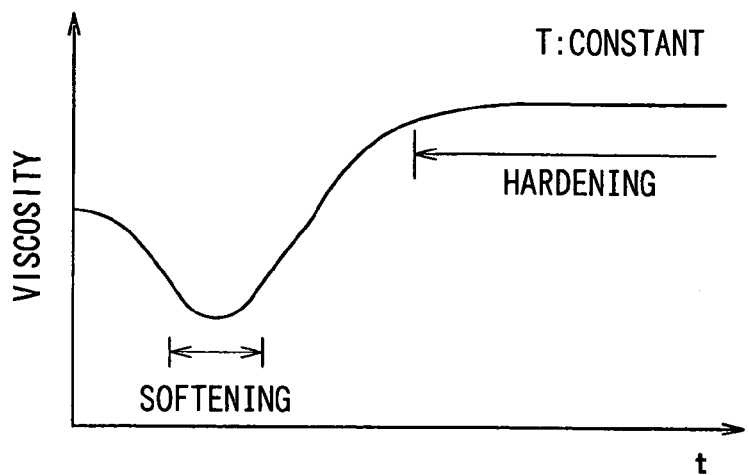
FIG. 6 is a schematic graph showing a viscosity variation of an insulating film used in the first embodiment, in accordance with a heating time (t)
Figure 7A:
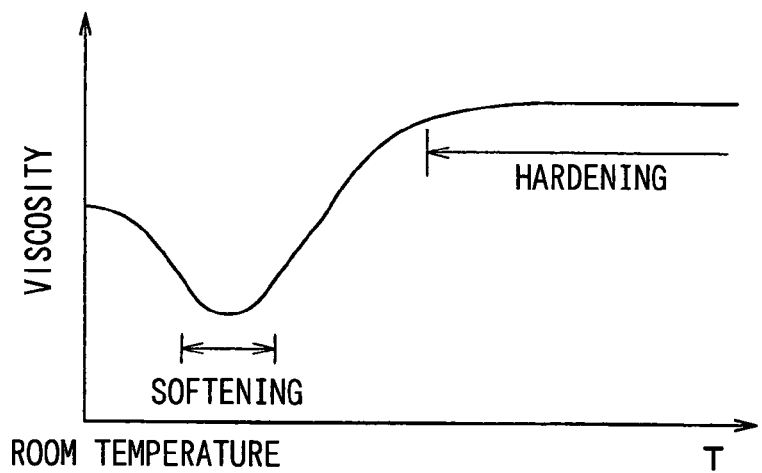
FIG. 7A is a schematic graph showing a viscosity variation of the insulating film used in the first embodiment in accordance with a heating temperature (T)
Figure 7B:
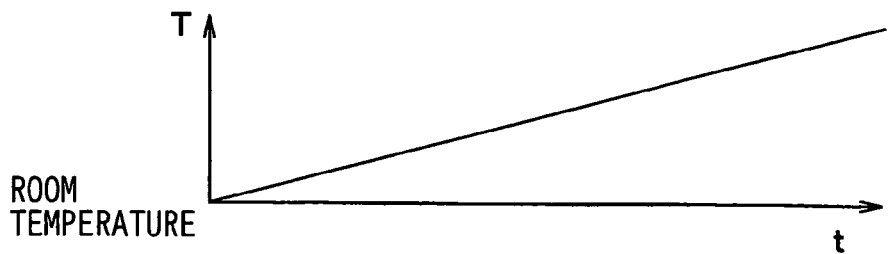
FIG. 7B is a schematic graph showing a relationship between a heating time (t) and the heating temperature (T) used in FIG. 7A.

FIGS. 6 through 7B explain the above described property of the insulating membrane 60 of this embodiment. FIG. 6 is a schematic graph showing changes in viscosity of the insulating membrane 60 by heat. FIGS. 7A and 7B are schematic graphs showing changes in viscosity of the insulating membrane 60 when a heating method is changed from the method in FIG. 6.

A relationship between a heating time t and the viscosity of the insulating membrane 60, when the insulating membrane 60 is kept heated for a predetermined time at a temperature T that can harden the insulating film 60, is shown in FIG. 6. As the heating time t increases, the viscosity becomes smaller and the insulating film 60 becomes soft for a while compared to a starting point. Then, the viscosity becomes larger than the one at the starting point and the insulating film 60 hardens.

FIG. 7A shows a relationship between the viscosity of the insulating film 60 and a heating temperature T which is gradually increased to a hardening temperature of the insulating film 60 as the heating time t passes as shown in FIG. 7B. In this case, the transition of the viscosity of the insulating film 60 shows a similar property in FIG. 6.

Figure 8:
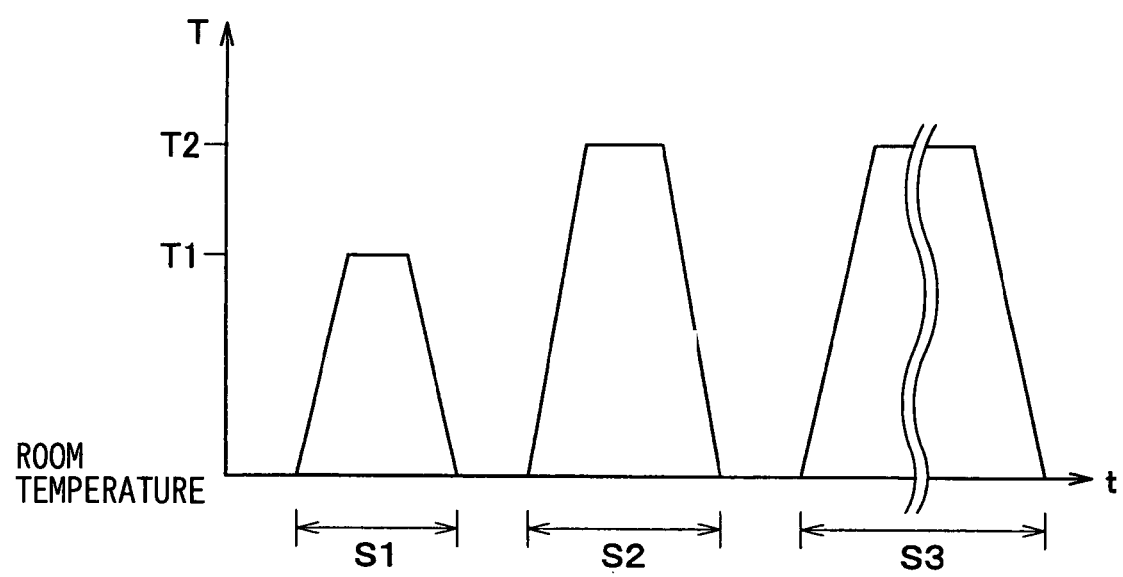
FIG. 8 is a schematic graph showing an example of temperature profiles in the manufacturing method of the pressure sensor according to the first embodiment.

FIG. 8 shows an example of temperature profiles (temperature control patterns) of a pasting process S1 (pasting step), a connecting process S2 (connecting step) and a sealing process S3 (sealing step) in the manufacturing method using the insulating membrane 60 having the above-described property. A horizontal axis shows a heating time t and a vertical axis shows a heating temperature T.

In the pasting process S1, the insulating membrane 60 is heated at a first temperature T1 (e.g., 80° C.), for example for a period of one second to several seconds so that the insulating membrane 60 is pasted on the back surface of the wiring board 40. Then, the temperature of the insulating membrane 60 is brought back to a room temperature and the connecting process S2 is performed.

At the connecting process S2, as shown in FIG. 4A, the pressure receiving surface 20a of the sensor chip 20 is disposed to face the back surface of the wiring board 40. Then, the bumps 50 are pressed down to the insulating membrane 60 thereby the bumps 50 burst and penetrate through the insulating membrane 60. As a result, the bumps 50 are electrically connected with the base material electrodes 41.

At this step, the insulating membrane 60 is softened by heat and the electric connection of the bumps 50 with the base material electrodes 41 is performed as explained above under such condition of the insulating membrane 60. To be more specific, as shown in FIG. 8, the temperature of the connecting process S2 is increased to a second temperature T2 higher than the first temperature T1 of the pasting process S1. The connecting process S2 is performed by heating the insulating film 60, for example, at the second temperature T2 (e.g., 150° C.) for several seconds.

At the connecting process S2, the softened insulating membrane 60 changes their shapes by receiving loads of the bumps 50, and the bumps 50 are inserted into and penetrate through the insulating films 60. The base material electrodes 41 and the bumps 50 are ultrasonic-bonded while being in contact each other. Accordingly, the bumps 50 and the base material electrodes 41 are metal-bonded and electrically connected, as shown in FIG. 5A.

After the temperature of the insulating membrane 60 is brought back to the room temperature, the sealing process S3 is performed. In the sealing process S3, the insulating membrane 60 is hardened by heat so that the peripheries of the connected bumps 50 and the base material electrodes 41 are sealed, respectively, by the insulating membrane 60.

Here, the insulating membrane 60 is kept heated by maintaining an arrangement of each part shown in FIGS. 5A and 5B. The connection portion of the bumps 50 is sealed with the insulating membrane 60 which becomes hard by heat. To be more specific, as shown in FIG. 8, the sealing process S3 is performed under the same second temperature T2 of the connecting process S2, e.g., at 150° C. for an hour.

Therefore, the insulating membrane 60 becomes hard maintaining the structural state shown in FIGS. 5A and 5B thereby the insulating membrane 60 adheres to the pressure receiving surface 20a and to the back surface of the wiring board 40 so that the connection portion around the bumps 50 is sealed. Thus, the pressure sensor 100 including the wiring board 40 of the base material having the sensor chip 20, which is electrically connected via the bumps 50, is easily formed.

In the example shown in FIG. 8, the temperature is brought back to the room temperature at intervals between each process S1, S2 and S3. However, the processes S1 to S3 can be performed successively by eliminating an operation of lowering the temperature of the insulating membrane 60 to the room temperature. Also, it is possible to set various patterns of temperature profiles other than the example shown in FIG. 8.

To sum up, as the insulating film 60 to be adopted in this embodiment, it can be any types as long as it has the above-described property as shown in FIGS. 6 and 7A. The connecting process S2 is performed while the insulating film 60 is soft and the sealing process S3 is performed while the insulating film is becoming hard. That is to say, each process S2 and S3 can be performed during an appropriate property range of the insulating film 60 as shown in FIG. 6 and FIG. 7A.

Next, a basic pressure detecting operation of the pressure sensor 100 will be described. The pressure sensor 100 is attached to an appropriate part of the vehicle via the screw portion 33 of the housing 30. The pressure mediums from outside (such as the refrigerant of the air conditioner or the lubricating oil of the vehicle etc., as previously described) are introduced into the pressure sensor 100 through the pressure introducing passage 32 of the housing 30.

The pressure of the pressure medium introduced like this way is not directly applied to the pressure receiving surface 20a but is applied to the pedestal 22, which is the opposite surface to the pressure receiving surface 20a of the sensor chip 20.

However, the pressure medium passes around the sides of the sensor chip 20 and flows towards the pressure receiving surface 20a of the sensor chip 20 through the gaps between the bumps 50 as shown in FIG. 2. Therefore, the pressure to be measured is applied to the pressure receiving surface 20a and is received by the diaphragm 21.

That is, in the pressure sensor 100 of this embodiment, although the connection portion of the bumps 50 is sealed by the insulating member 60, the insulating member 60 is still arranged so that the pressure can be applied to the pressure receiving surface 20a through the gaps between the bumps 50.

The diaphragm 21 of the sensor chip 20 deforms in accordance with the applied pressure, and the electric signals based on the deformation of the diaphragm 21 are transmitted to the wiring board 40 from the bumps 50 and further transmitted to the terminals 12. At this time, the electric signals are processed by amplifying or adjusting at a processing circuit provided in the vicinity of the sensor chip 20 or provided in the wiring board 40, and outputted as sensor signals from the wiring board 40 to the terminals 12.

The sensor signals are transmitted to the external circuits such as an ECU of the vehicle, via the terminals 12 that is provided in the connecting portion 16. The basic pressure detecting operation is performed as explained above.

According to the first embodiment, the pressure sensor 100 includes the connector case 10, as the first case, having the sensor chip 20 for outputting signals in accordance with the received pressure at the pressure receiving surface 20a which is arranged on the one surface of the sensor chip 20. The sensor chip 20 is arranged in the one end portion of the connector case 10, and the housing 30 as the second case is attached to the one end portion of the connector case 10 so that the sensor chip 20 is covered by the connector case 10. In this pressure sensor 100, the pressure is introduced through the pressure introducing passage 32 of the housing 30 towards the sensor chip 20.

In the pressure sensor 100, the wiring board 40 is provided at the one end portion of the connector case 10 so that the back surface of the wiring board 40 faces the pressure introducing passage 32. Further, the sensor chip 20 is electrically connected to the back surface of the wiring board 40 via the bumps 50 by flip-chip bonding, in a state where the pressure receiving surface 20a is at opposite to the back surface of the wiring board 40.

The connection portion of the bumps 50 is sealed with the insulating member 60 having an electrically insulating property.

In this pressure sensor 100, the wiring board 40 is provided to the one end of the connector case 10, and the sensor chip 20 is electrically connected to the back surface of the wiring board 40 via the bumps 50 by using the flip-chip bonding. Therefore, the pressure sensor can be made compact and is advantageous in this regard because the flip-chip bonding of the sensor chip 20 requires a smaller area for bonding compared to a wire bonding.

Although the wiring board 40 is provided so that the back surface of the wiring board 40 faces the pressure introducing passage 32, the pressure receiving surface 20a of the sensor chip 20 faces to the back surface of the wiring board 40. That is, the pressure receiving surface 20a of the sensor chip 20 faces the opposite direction to the pressure introducing passage 32.

In this pressure sensor 100, the pressure medium does not directly hit the pressure receiving surface 20a. Therefore, a direct collision of a strange object to the pressure receiving surface 20a or an adhesion of contaminated material to the same are restricted thereby harmful effects on the properties of the sensor chip 20 by the pressure medium can be effectively reduced.

Also, as described above, the pressure is introduced through the gap between the bumps 50 to the pressure receiving surface 20a of the sensor chip 20 after turning around the sensor chip 20. Therefore, the pressure to be measured is applied to the pressure receiving surface 20a appropriately, and the pressure detection is not affected.

Because the connection portion of the bumps 50 is sealed by the insulating member 60 having the electrically insulating property, the bumps 50 or the electrodes on the sensor chip 20, which are environmentally sensitive components, are sealed by the insulating member 60 and protected from the pressure medium.

Therefore, in the pressure sensor 100, a corrosion of the bumps 50 or the electrodes on the sensor chip 20 caused by the pressure medium can be avoided, thereby the deterioration of the electrically connection portion of the sensor chip 20 due to the pressure medium can be avoided.

Because the housing 30 having the pressure introducing passage 32 for introducing the pressure to the sensor chip 20 is attached to the one end portion of the connector case 10 having the sensor chip 20, the pressure sensor 100 can be made compact without deteriorating the properties of the same.

In the pressure sensor 100 according to this embodiment, the resinous or ceramic insulating material can be used for the insulating member 60.

According to the manufacturing method of the pressure sensor 100 explained by referring to FIG. 3A through to FIG. 8, the bumps 50 are provided on the base material electrodes 41 of the wiring board 40 at the side of the sensor chip 20, and the base material electrodes 41 provided on the wiring board 40 are covered by the insulating membrane 60 in advance. Then, the sensor chip 20 and the wiring board 40 are disposed to face each other and make the bumps 50 burst through the insulating membrane 60. Therefore, the electrical connection between the sensor chip 20 and the wiring board 40 can be easily performed, and the electrically connection portion is sealed with the hardened insulating membrane 60 by heat.

When the sensor chip 20 and the wiring board 40 as the base material are electrically connected via the bumps 50, there is no need of injecting an adhesive material through gaps between the sensor chip 20 and the wiring board 40 after the connection of these two members, because the sealing of the connection portion of the bump 50 can be completed.

In the conventional method, because the adhesive material is injected through the gaps between the sensor chip 20 and the wiring board 40 after these two members are connected via the bumps 50, the injection of the adhesive material might not be performed accurately due to a capillary phenomenon or the like. However, in the manufacturing method of the pressure 100 according to the present invention, since the insulating film 60 is provided before the sensor chip 20 is arranged to face the wiring board 40, more accurate arrangement of the insulating membrane 60 is possible.

Also, because the film typed insulating material is used as the insulating membrane 60, the film can be cut into a shape to match with a pattern required in the arrangement. Therefore, the more accurate arrangement of the insulating membrane 60 is possible and at the same time the insulating membrane 60 has an even thickness.

(Second Embodiment)

Figure 9:
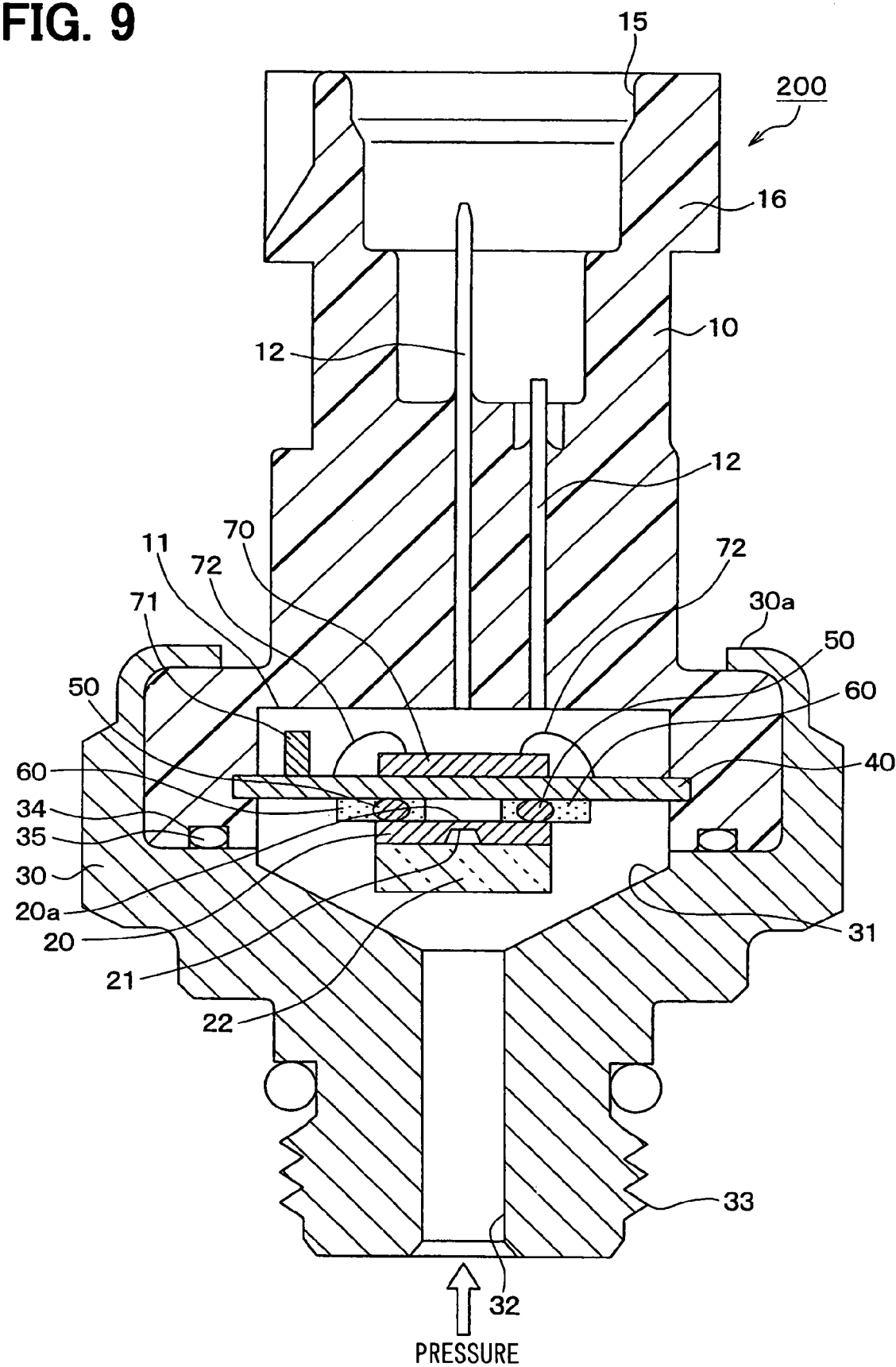
FIG. 9 is a schematic cross-sectional view showing a pressure sensor according to a second embodiment of the present invention.

FIG. 9 is a schematic cross-sectional view showing a pressure sensor 200 according to a second embodiment of the present invention. Differences from the first embodiment will be mainly explained hereinafter.

As shown in FIG. 9, a circuit chip 70 and a condenser 71 are provided on a front surface (an upper surface in FIG. 9) of the wiring board 40, that is the opposite to the surface to which the sensor chip 20 is mounted.

Here, the circuit chip 70 is mounted to the front surface of the wiring board 40 via a die mount material or the like and is electrically connected with the wiring board 40 via bonding wires 72. The circuit chip 70 is provided for the purpose of adding a transmission function or similar objectives. The condenser 71 is provided for the purpose of improving an EMC resistance (noise resistance properties).

In this case, the wiring board 40 is the multi-layered board and it is preferable to electrically connect the back surface of the wiring board with the front surface thereof by inlayer wirings or through-hole connection. Therefore, at the wiring board 40, the sensor chip 20 provided on the back surface thereof can transmit signals to the circuit chip 70 or the condenser 71 provided on the front surface of the wiring board 40.

Although it is not shown in FIG. 9, in the pressure sensor 200 of the second embodiment, the wiring board 40 and the terminals 12 can be electrically connected by various electrical connecting means such as the soldering, the welding, the brazing or the conductive adhesive material.

The pressure sensor 200 according to the second embodiment can be manufactured basically using the manufacturing method as explained in the first embodiment.

That is, the wiring board 40, on which the sensor chip 20 integrated with the pedestal 22 by the flip-chip bonding and the insulating member 60 are formed thereon, is prepared. The wire-bonded circuit chip 70 and the condenser 71 are also mounted on the wiring board 40.

The wiring board 40 is provided in the recess 11 of the connector case 10, and the wiring board 40 and the terminals 12 are electrically connected. Then, the housing 30 and the connector case 10 are fastened by the O-ring 35 for an integration, and the assembly of the pressure sensor 200 shown in FIG. 9 is completed.

The pressure sensor 200 having the above structure can also be made compact without deteriorating the properties of the sensor.

In the pressure sensor 200 according to the second embodiment, the circuit chip 70 and the condenser 71 are required for the purposes of the improvement in the EMC resistance or the addition of transmission function as explained. Even in such case, it is possible to mount the circuit chip 70 and the condenser 71 on the front surface of the wiring board 40 of the pressure sensor 200 without increasing an overall size of the sensor 200, especially increasing in the radical direction of the same (a left-right direction in FIG. 9).

(Third Embodiment)

In the above-described connecting method as shown in FIG. 3A through FIG. 5B, the one member having the bumps 50 thereon is the sensor chip 20 and the other member having the electrodes 41 thereon, at the corresponding parts of the bumps 50, is the wiring board 40 as the base material. In the third embodiment, the one member having the bumps 50 thereon is the wiring board 40 and the other member to be electrically connected to the bumps 50 is the sensor chip 20.

Figure 10:
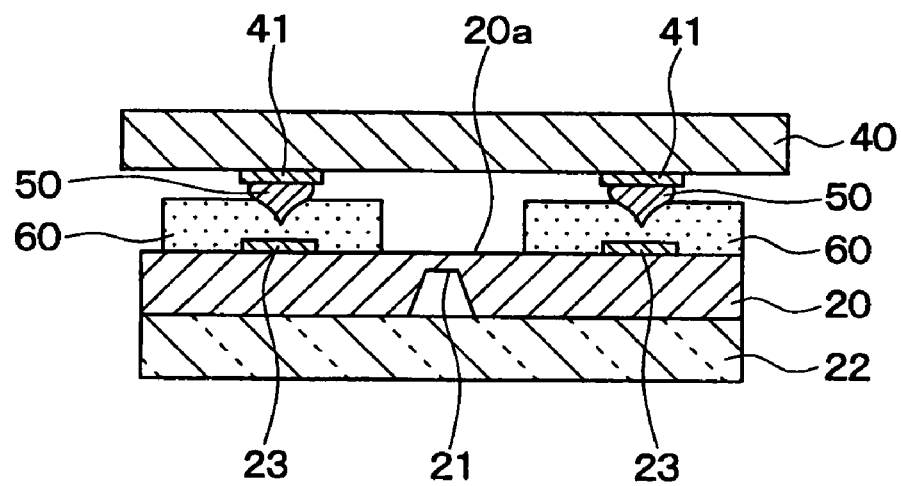
FIG. 10 is a schematic cross-sectional view showing a connecting process in a manufacturing method of the pressure sensor according to a third embodiment of the present invention.
Figure 11:
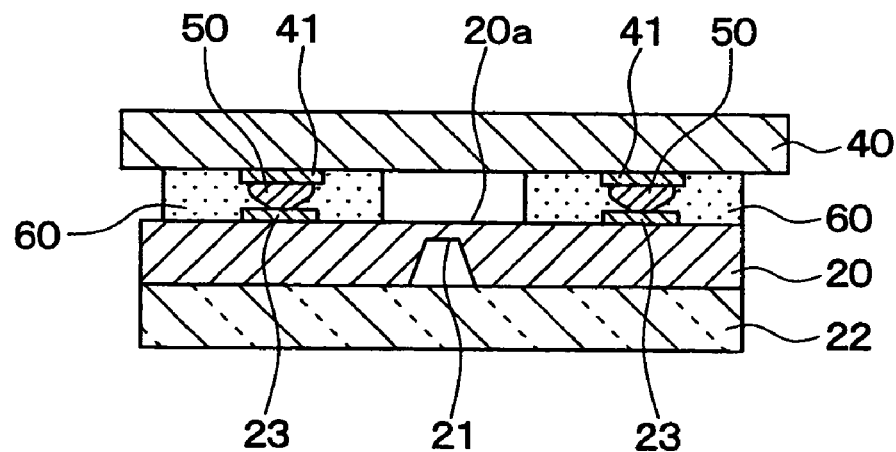
FIG. 11 is a schematic cross-sectional view showing the connecting process and a sealing process in the manufacturing method of the pressure sensor according to the third embodiment.

FIGS. 10 and 11 show manufacturing processes of a pressure sensor according to the third embodiment. FIGS. 10 and 11 are cross-sectional views showing the manufacturing method in which the sensor chip 20 is connected to the wiring board 40 via the bumps 50 when the insulating member 60 is a film. FIG. 10 shows a connecting process, and FIG. 11 shows a sealing process.

In the manufacturing method of the pressure sensor according to the third embodiment, the bumps 50 are provided on the back surface of the wiring board 40. On the pressure receiving surface 20a of the sensor chip 20, the chip electrodes 23 are provided at positions which are opposite to the bumps 50. Here, a formation of the bumps 50 to the back surface of the wiring board 40 is performed to the surfaces of the base material electrodes 41 by the wire-bonding apparatus, as is performed in the first embodiment.

The wiring board 40 on which the bumps 50 are provided and the sensor chip 20 on which the chip electrodes 23 are provided are thus prepared. Then, the pasting process, the connecting process and the sealing process are performed successively. In the third embodiment, in the pasting step, the insulating membrane 60 is pasted on the one surface of the sensor chip 20, which is the pressure receiving surface 20a. Therefore, the chip electrodes 23 are covered with the insulating membrane 60.

The insulating membrane 60 in the third embodiment is the same as used in the first embodiment, and the temperature control pattern of each process is the same as that shown in FIG. 8.

At the connecting step, as shown in FIG. 10, the pressure receiving surface 20a of the sensor chip 20 is arranged to face the back surface of the wiring board 40. Then, the bumps 50 are pushed from above the insulating membrane 60 thereby the bumps 50 burst and penetrate through the insulating membrane 60. Therefore, the bumps 50 become in contact with the chip electrodes 23, and the bumps 50 and the chip electrodes 23 are metal-bonded by the ultra-sonic bonding and electrically connected as shown in FIG. 11.

The following sealing step is the same as explained in the first embodiment. The insulating membrane 60 becomes hard maintaining the structural state shown in FIG. 11, and the sealing of the connection portions of the bumps 50 by the insulating membrane 60 is completed. The pressure sensor according to the third embodiment in which the sensor chip 20 and the wiring board 40 as the base material are connected via the bumps 50 is constructed.

As explained above, according to the manufacturing method of the pressure sensor of the third embodiment, the bumps 50 are provided at the surface of the wiring board 40, and the chip electrodes 23 arranged on the sensor chip 20 are covered by the insulating membrane 60 in advance. Then the sensor chip 20 and the wiring board 40 are arranged to face each other and the bumps 50 are made to penetrate through the insulating membrane 60, thereby the sensor chip 20 and the wiring board 40 are electrically connected. The sealing of the electrically connection portion is completed by making the insulating membrane 60 hard by heat.

Therefore, when the sensor chip 20 and the wiring board 40 as the base material are electrically connected via bumps 50, the sealing of the connection portion of the bumps 50 can be completed without injecting the adhesive material through the gaps between the sensor chip 20 and the wiring board 40.

(Other Embodiments)

Although the present invention has been described in connection with some preferred embodiments thereof with reference to the accompanying drawings, it is to be noted that various changes and modifications will become apparent to those skilled in the art.

For example, the sensor chip 20 is not necessarily limited to a semiconductor diaphragm type as explained, but can be any types as long as the sensor chip can convert the received pressure at the pressure receiving surface 20a into electric signals and output the same as sensor signals.

The first case is not necessarily limited to the connector case 10 as explained, but can be any members as long as it can accommodate the wiring board 40 at its one end. Similarly, the second case is also not necessarily limited to the housing 30 as explained, but can be any members as long as it has the pressure introducing passage.

As for the materials used in the first and second cases, they are not necessarily limited to the resin or the metal as explained in the embodiments. However, they can be changed as appropriate. Also as to the assembling method of the first case with the second case, it is not necessarily limited to the fastening as explained, but can be an adhesion or a joint.

Figure 12A:
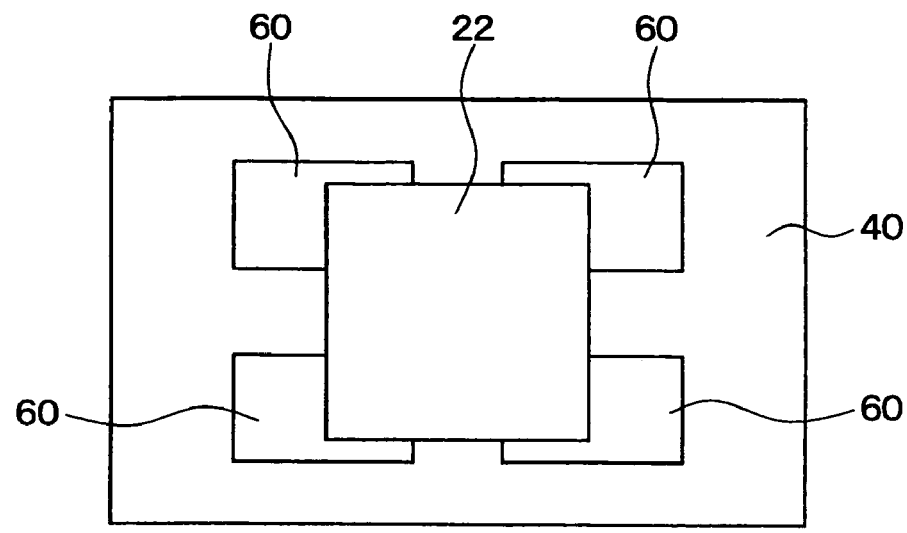
FIG. 12A is an enlarged plain view showing a vicinity of a sensor chip of a pressure sensor according to a modification of the present invention.

In the previously described embodiments, the pressure is introduced through the gaps between the bumps 50 to the pressure receiving surface 20a of the sensor chip 20 after passing around the sensor chip 20, because of the arrangement of the insulating members 60, for example, as shown in FIG. 2. However, the arrangement of the insulating members 60 can be varied as shown in FIGS. 12A through 13B. FIGS. 12A through FIG. 13A are top views, and the FIG. 12B is a transparent top view of FIG. 12A and FIG. 13B is a transparent top view of FIG. 13A.

Figure 12B:
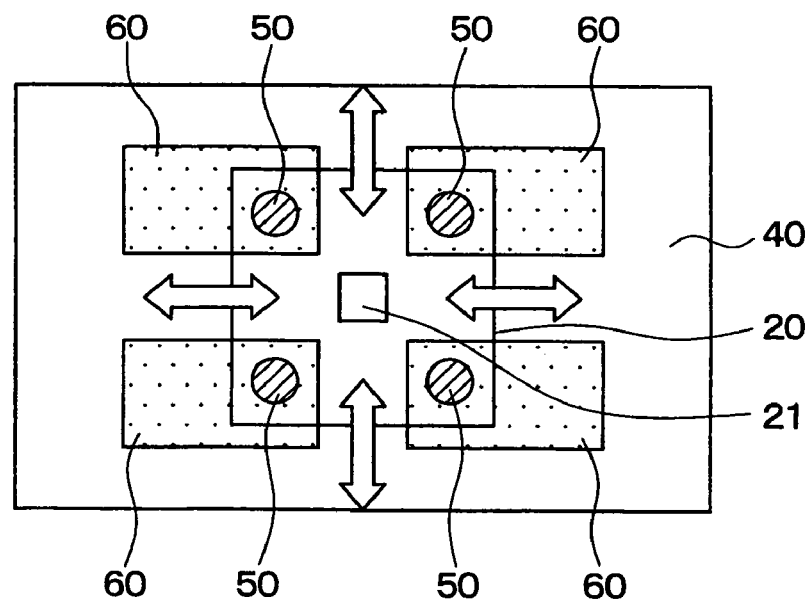
FIG. 12B is a transparent top view of FIG. 12A.
Figure 13A:
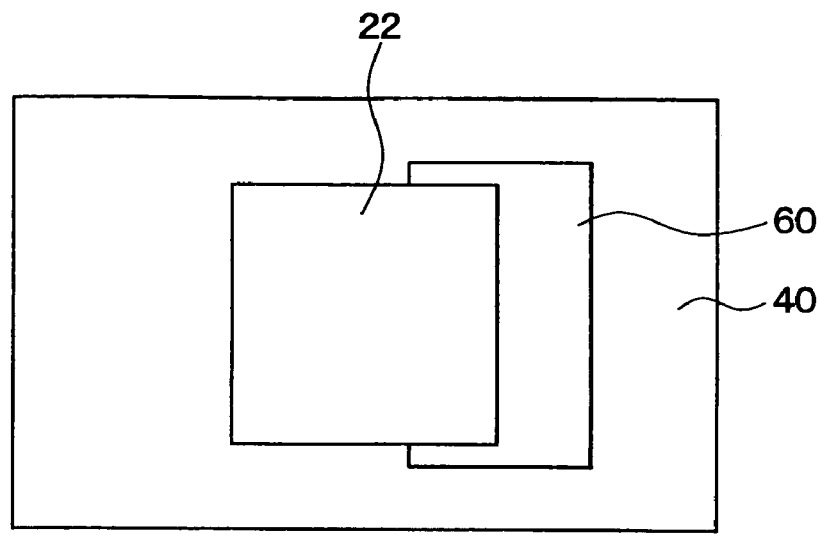
FIG. 13A is an enlarged plain view showing a vicinity of a sensor chip of a pressure sensor according to another modification of the present invention.
Figure 13B:
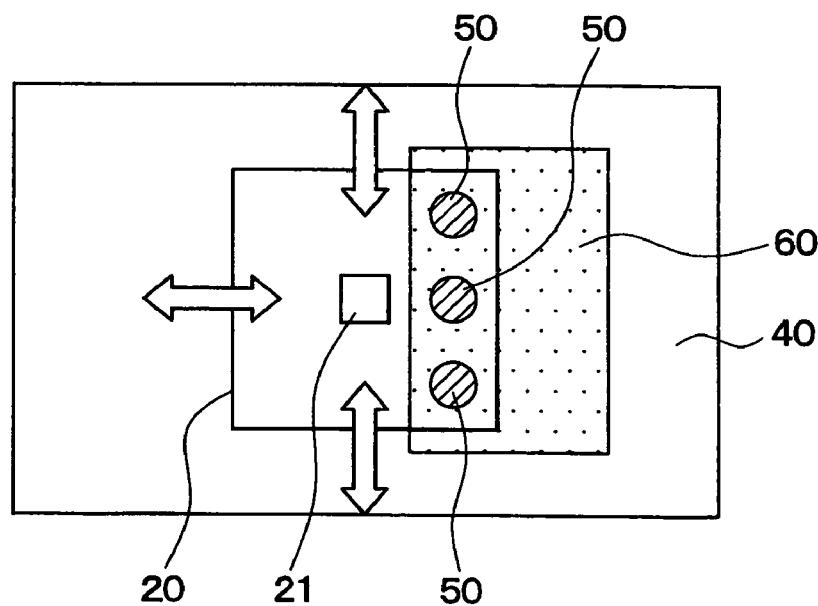
FIG. 13B is a transparent view of FIG. 13A.

In order to introduce the pressure through the gaps between the bumps 50 to the pressure receiving surface 20a after passing around the sensor chip 20, the bumps 50 can be so arranged that the gaps are created at every interval of the bumps 50 as shown in FIGS. 12A and 12B. Also, the connection portions by the bumps 50 can be disposed collectively at one side on the surface of the sensor chip 20 as shown in FIGS. 13A and 13B. The arrangement positions of the bumps 50 and the number thereof can be suitably changed.

The manufacturing method of the pressure sensor is not necessarily limited to the explained methods, but different kinds of manufacturing methods of the pressure sensor can be taken as long as the method has the process in which the sensor chip 20 and the wiring board 40 are electrically connected.

For example, only when the insulating membrane can be torn by pressure of the bumps 50 and become hard by heat, other types of insulating members other than the described insulating membrane 60 can be used.

The insulating membrane 60 is not necessarily film-shaped when it is used to connect the sensor chip 20 with the wiring board 40 as the base material. It can be a NCP made from the epoxy resin, for example.

For example, the NCP in paste form is dispensed on a first member, which is a member different from and opposite to a second member in which the bumps 50 are arranged. Then, the NCP is half-hardened to make it into a film-form and is pasted on the first member. Then, the NCP is softened during the connecting process and becomes hard again at the sealing process as in the same manners explained in the first and second embodiments.

As for the connection of the sensor chip 20 with the wiring board 40 as the base material, the base material is not necessarily the plate-formed wiring board 40, but it can be a block-shaped wiring member in which metal electrodes are insert-molded. Also, the sensor chip 20 does not need to have the pedestal 22, but the back surface of the diaphragm 21 can be made as the pressure receiving surface where the pressure medium can be applied directly.

It is needless to mention that the pressure sensor according to present invention can be applied to any one other than sensors for detecting a fuel pressure, a lubricating oil pressure for an engine or a driving system, a refrigerant pressure for an air conditioner and an exhaust gas pressure.

While the invention has been described with reference to preferred embodiments thereof, it is to be understood that the invention is not limited to the preferred embodiments and constructions. The invention is intended to cover various modification and equivalent arrangements. Other combinations and configuration are also within the spirit and scope of the invention.

What is claimed is:

1. A pressure sensor comprising:
    a sensor chip for outputting an electric signals in accordance with a pressure received at a pressure receiving surface formed on a one surface of the sensor chip;

a first case having one end portion at which the sensor chip is provided;

a second case attached to the one end portion of the first case to cover the sensor chip, wherein the second case is provided with a pressure introducing passage for introducing the pressure to the sensor chip;

a wiring board provided at the one end portion of the first case to have a surface facing toward the pressure introducing passage;

a plurality of bumps through which the sensor chip is electrically connected with the surface of the wiring board by a flip-chip bonding such that the pressure receiving surface faces the surface of the wiring board; and an insulating member having an electrically insulating property, which seals a connection portion of the bumps.

2. The pressure sensor according to claim 1, wherein the insulating member is made of a resin or a ceramic, which has the electrically insulating property.

3. The pressure sensor according to claim 1, wherein the insulating member has a film shape.

4. The pressure sensor according to claim 1, wherein the insulating member is constructed of a plurality of film parts separated from each other to form at least a gap between the bumps, through which the pressure introduced from the pressure introducing passage is applied to the pressure receiving surface.

* * * * *